Patented Oct. 28, 1947

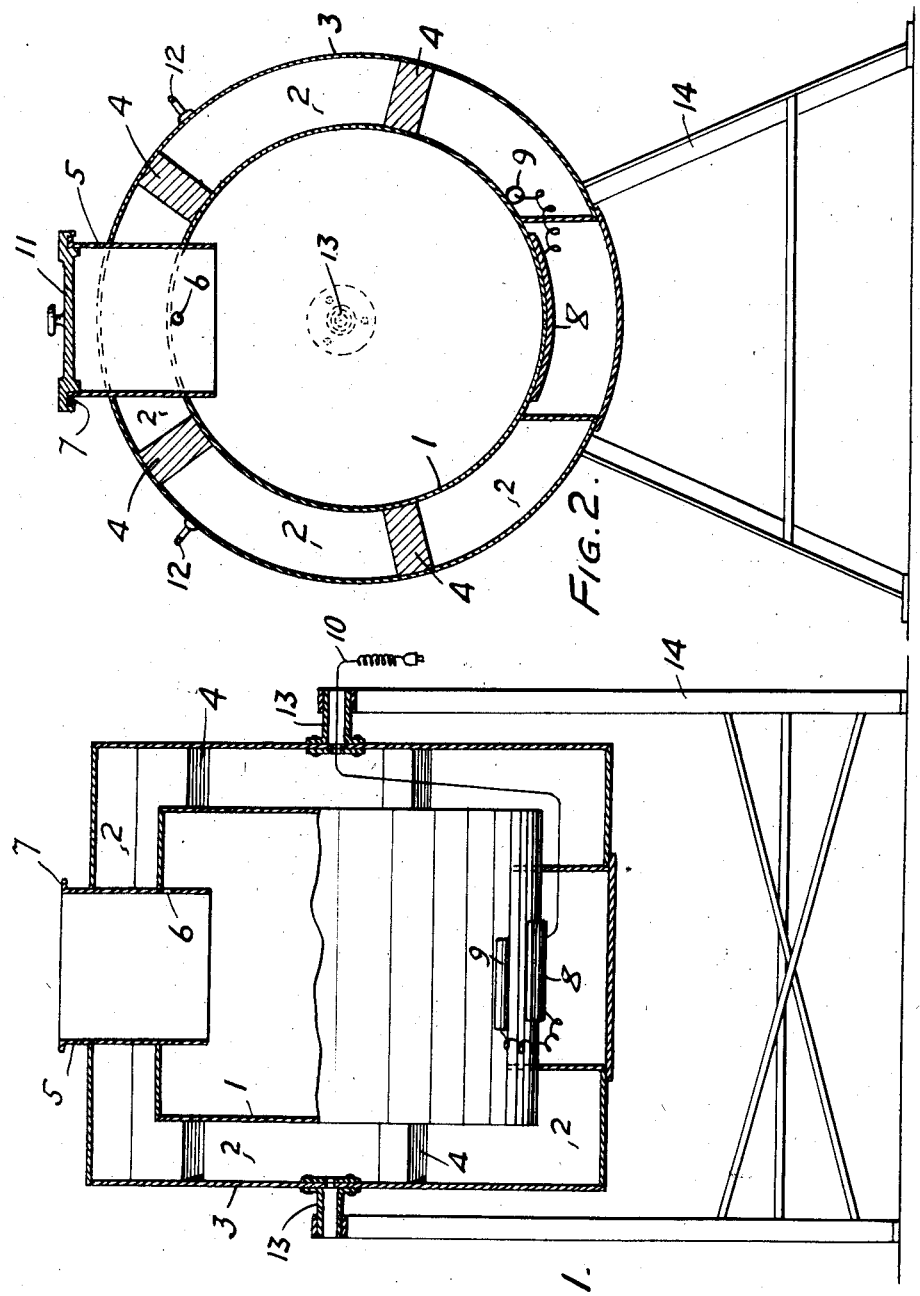

2,429,662

UNITED STATES PATENT OFFICE 2,429,662

ELECTRICALLY HEATED ROTATABLE LIQUID CONTAINER

Donald F. Ayres, Poughkeepsie, N. Y., assignor to The De Laval Separator Company, New York, N. Y., a corporation of New Jersey Application June 7, 1945, Serial No. 597,979

7 Claims. (Cl. 219—38)

My invention relates to heaters for heating water or other liquids by electrical energy.

The object of my invention is to provide an electrically heated liquid container that is easily filled, that can be poured from easily and quickly, that will be economical of power and that, when released after liquid has been poured out of it, will return automatically to its normal upright position.

A heater embodying my invention consists of a cylindrical metal container for liquid to be heated, having an opening, functioning both as an inlet and outlet, through the cylindrical wall at one side and an electric heating element in heat transfer relation with the container at the diametrically opposite side. Though this container may be supported on ways on which it may be rolled I prefer to support it on trunnions at or adjacent to the axis of the cylinder. Either of these supporting means permits rotation of the cylindrical container around the contained liquid with no or little change of liquid level and therefore with little effort on the part of the user. The weight of the heating element normally holds the container in such position that the heating element is at the bottom and the outlet at the top and, after the container is turned to effect pouring, tends to automatically return the container to its normal position. This tendency may be increased by placing the trunnions a small distance off center toward the side at which the outlet is located.

By making rather large the outlet, which, as above stated, is used also as the inlet, I provide for quick and easy filling and emptying of the container.

While I have shown a heater with the heating element attached to the outside of the container, this element may, if desired, be placed inside the container where it will be surrounded by liquid in direct contact with it.

In the accompanying drawings, which illustrate embodiments of my invention—

Fig. 1 is a partial longitudinal section of a heater mounted on trunnions and the supports therefor.

Fig. 2 is a section at right angles to that shown in Fig. 1.

Figure 3:
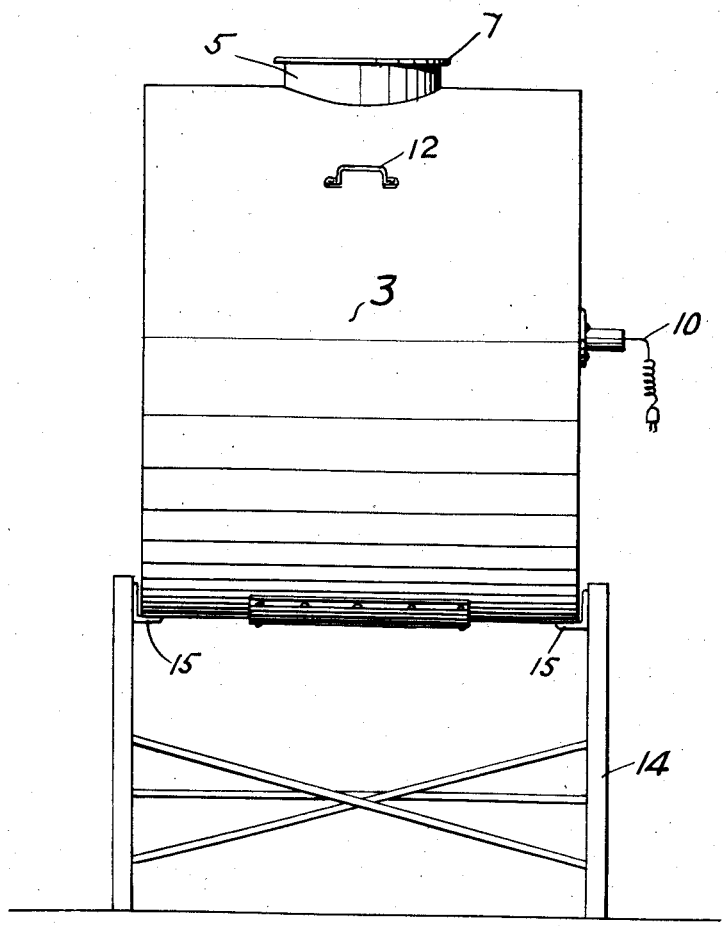
Fig. 3 is a side view of a heater arranged to roll on horizontal ways.

I is a cylindrical container for liquid to be heated, surrounded by heat insulation in the spaces 2 enclosed by an outer casing 3. The container is held in the center of the casing by spacers 4—4.

An inlet and outlet tube 5 extends through the insulation-containing space 2 and to a substantial distance inside the container I and has a small hole 6 through it tangent with the inside of container I. The outer end of the tube is surrounded by a flange or bead 7.

An electric heater 8 and a thermostatic switch 9 are secured in heat transfer relation with the container I and a cord 10 is provided for connection to a source of electric energy.

An easily removable cover 11 on the outer end of the tube 5 prevents escape of vapors from the heater. Handles 12 provide means for tipping the heater into position to pour out liquid.

As shown in Figs. 1 and 2, the heater is supported by trunnions 13—13 carried by a frame 14. As shown in Fig. 3, the heater is supported, on a similar frame 14, by ways 15 on which it may be rolled.

In operation the desired quantity of liquid is poured into the heater, the cover 11 applied and the current turned on. When the liquid is heated to the temperature for which the thermostat 9 is set the current is turned off.

When hot liquid is wanted, the operator places a receptacle at one side of the heater, removes the cover 11 and by means of one of the handles 12 turns the heater till the desired quantity flows out. When he releases the handle the heater will return to its normal position with the outlet at the top.

The construction shown embodies certain features which are no part of my invention, being the subject-matter of a separate application filed of even date by Donald B. Vandwater, Serial No. 597,980. These features are: surrounding the outlet by a tube which extends a substantial distance inside the cylinder and which has a small hole inside the cylinder and tangent therewith. These features insure, after the rapid discharge from the container of the bulk of the liquid, the retention of a small quantity of liquid adjacent the heating element, so that the container will not be damaged by overheating, but which allow such residual liquid to be slowly drained out if it is desired to effect complete emptying.

What I claim and desire to protect by Letters Patent is:

1. In a heater for liquids, in combination, a heat insulated cylindrical container, a frame supporting the container and ways on the frame along which the container may be rolled, an electric heating element in heat transfer relation with the cylinder at one side thereof and a combined inlet and outlet for liquid at the opposite side of the cylinder.

2. A heater for liquids, comprising a cylindrical container arranged with its axis in a generally horizontal plane, the container having a peripheral opening in its cylindrical surface, a cylindrical casing having end walls opposing the end walls of the container and also having a cylindrical surface completely surrounding the cylindrical surface of the container except for an opening in the casing aligned with said first opening and communicating therewith, the casing having its axis in a generally horizontal plane and being spaced from the container to provide a space for insulation, an electric heating element on the container opposite the container opening so as to be in heat exchange relation with liquid in the container, a pipe fitted closely in said openings and extending generally perpendicular to the axis of the cylindrical container, and a frame on which the container and casing are turnable, about an axis substantially parallel to the axis of the cylindrical container, between a liquid filling and heating position in which the pipe is at the top and the heating element at the bottom, and a liquid discharging position in which the liquid may be poured from the container through the pipe.

3. A heater as defined in claim 2 in which the means supporting the heater on the frame, in cooperation with the weight of the heating element, tends to automatically return the heater from a liquid discharging position to the filling and heating position.

4. A heater as defined in claim 2, in which the cylindrical casing and the cylindrical container are disposed in concentric relation.

5. A heater as defined in claim 2, comprising also a plurality of members arranged in said space and extending parallel to the axis of the container and from the outer cylindrical surface of the container to the inner cylindrical surface of the casing, said members acting to secure the container and casing against relative radial movement and also to hold the insulation in position.

6. A heater as defined in claim 2, comprising also a plurality of members arranged in said space and extending from the outer cylindrical surface of the container to the inner cylindrical surface of the casing to secure the container and casing against relative radial movement, said members also extending from one end of the casing to its other end to reinforce the end walls of the casing.

7. A heater as defined in claim 2, in which the pipe projects outwardly beyond the periphery of the casing to form a neck, and a removable cover on top of the neck.

DONALD F. AYRES.

REFERENCES CITED

The following references are of record in the file of this patent:

UNITED STATES PATENTS

| Number | Name | Date |
|---|---|---|
| 1,462,322 | Casoletti | July 17, 1923 |
| 2,024,062 | Preedit | Dec. 10, 1935 |

FOREIGN PATENTS

| Number | Country | Date |
|---|---|---|
| 563,027 | France | Sept. 19, 1923 |